(12) United States Patent
Dreher et al.

(10) Patent No.: US 11,924,304 B2
(45) Date of Patent: Mar. 5, 2024

(54) ACCESSING CACHED DATA USING HASH KEYS

(71) Applicant: International Business Machines Corporation, Armonk, NY (US)

(72) Inventors: Brian S. Dreher, San Jose, CA (US); Sheng Hua Bao, San Jose, CA (US); Xiaoyang Gao, San Jose, CA (US); Yanyan Han, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 16/047,595

(22) Filed: Jul. 27, 2018

(65) Prior Publication Data

US 2020/0036806 A1 Jan. 30, 2020

(51) Int. Cl.
| | |
|---|---|
| *G06F 15/16* | (2006.01) |
| *G06F 16/22* | (2019.01) |
| *G06F 16/2455* | (2019.01) |
| *G06F 16/84* | (2019.01) |
| *H04L 9/06* | (2006.01) |
| *H04L 67/568* | (2022.01) |
| *H04L 67/60* | (2022.01) |

(52) U.S. Cl.
CPC ........ *H04L 67/568* (2022.05); *G06F 16/2255* (2019.01); *G06F 16/24552* (2019.01); *G06F 16/86* (2019.01); *H04L 9/0643* (2013.01); *H04L 67/60* (2022.05)

(58) Field of Classification Search
CPC ... H04L 67/2842; H04L 9/0643; H04L 67/32; H04L 67/2852; G06F 16/86; G06F 16/2255; G06F 16/24552
See application file for complete search history.

(56) References Cited

U.S. PATENT DOCUMENTS

| | | | |
|---|---|---|---|
| 7,653,703 B2 | 1/2010 | Tomura et al. | |
| 7,849,269 B2 | 12/2010 | Sundarrajan et al. | |
| 9,043,428 B2 | 5/2015 | Lobo et al. | |
| (Continued) | | | |

FOREIGN PATENT DOCUMENTS

| | | |
|---|---|---|
| CN | 106527988 | 3/2017 |
| CN | 104050103 | 7/2017 |

OTHER PUBLICATIONS

Goel, et al. Removing Duplicate URLs base on URL Normalization and Query Parameter. IJET, 7(3.12), Apr. 2018, pp. 361-365. (Year: 2018).*

(Continued)

*Primary Examiner* — Alex Gofman
*Assistant Examiner* — Shelly X Qian
(74) *Attorney, Agent, or Firm* — Edell, Shapiro & Finnan, LLC

(57) ABSTRACT

A computer system accesses a storage device. Contents of an object of a request are sorted. The contents of an object of a request are sorted. A hash key is generated to access information in the storage device based on the sorted contents of the object, wherein objects with non-critical differences are mapped to the same hash key. The information in the storage device is accessed based on the generated hash key to produce a response to the request. Embodiments of the present invention further include a method and program product for accessing a storage device in substantially the same manner described above.

12 Claims, 4 Drawing Sheets

(56) References Cited

U.S. PATENT DOCUMENTS 9,305,056 B1 *    4/2016  Gupta ............... G06F 16/24552
2017/0142226 A1   5/2017  De Foy et al.

OTHER PUBLICATIONS

An Introduction to JSON. Tagliaferri. DigitalOcean.com. 2016. pp. 1-15. (Year: 2016).*
The components of a URL. IBM CICS Transaction Server 4.2.0 Documentation, Apr. 2018, pp. 1-3. (Year: 2018).*
Baeldung. Guide to Java URL encoding/decoding. https://www.baeldung.com/java-url-encoding-decoding, pp. 1-7, Apr. 2018. (Year : 2018).*
Unicode Collation Algorithm. Unicode Technical Standard #10, http://www.unicode.org/reports/tr10/tr10-36.html, pp. 1-66, 2017. ( Year: 2017).*
Jardine. When Should I Encode? https://www.jardinesoftware.net/2011/09/25/when-should-i-encode/, 2011, pp. 1-4. (Year: 2011).*
Zhang, M., Tang, J., Rao, Y. et al., Degree-based probabilistic caching in content-centric networking. China Communications, 14(3), Mar. 2017, pp. 158-168.

* cited by examiner

ACCESSING CACHED DATA USING HASH KEYS

BACKGROUND

1. Technical Field

Present invention embodiments relate generally to accessing cached data, and more specifically, to accessing cached data by generating hash keys in a manner that increases cache hit ratios.

2. Discussion of the Related Art

A cache refers to a hardware or software component that stores data so that future requests for that data may be served more quickly. Data stored in a cache might be the result of an earlier computation or a previously-filled request. A cache hit occurs when the data that is requested can be found in a cache; likewise, a cache miss occurs when the requested data is not in a cache. A cache hit ratio is calculated by dividing a total number of cache hits over a given time period by the total number of requests (e.g., cache hits and cache misses), and is usually represented as a percentage. In general, an efficient caching policy seeks to maximize the number of cache hits while minimizing the number of cache misses; thus, a higher cache hit ratio corresponds to lower latency for responding to requests and better resource utilization.

SUMMARY

According to one embodiment of the present invention, a computer system accesses a storage device. The contents of an object of a request are sorted. A hash key is generated to access information in the storage device based on the sorted contents of the object, wherein objects with non-critical differences are mapped to the same hash key. The information in the storage device is accessed based on the generated hash key to produce a response to the request. Embodiments of the present invention further include a method and program product for accessing a storage device in substantially the same manner described above.

BRIEF DESCRIPTION OF THE DRAWINGS

Generally, like reference numerals in the various figures are utilized to designate like components.

DETAILED DESCRIPTION

Figure 1:
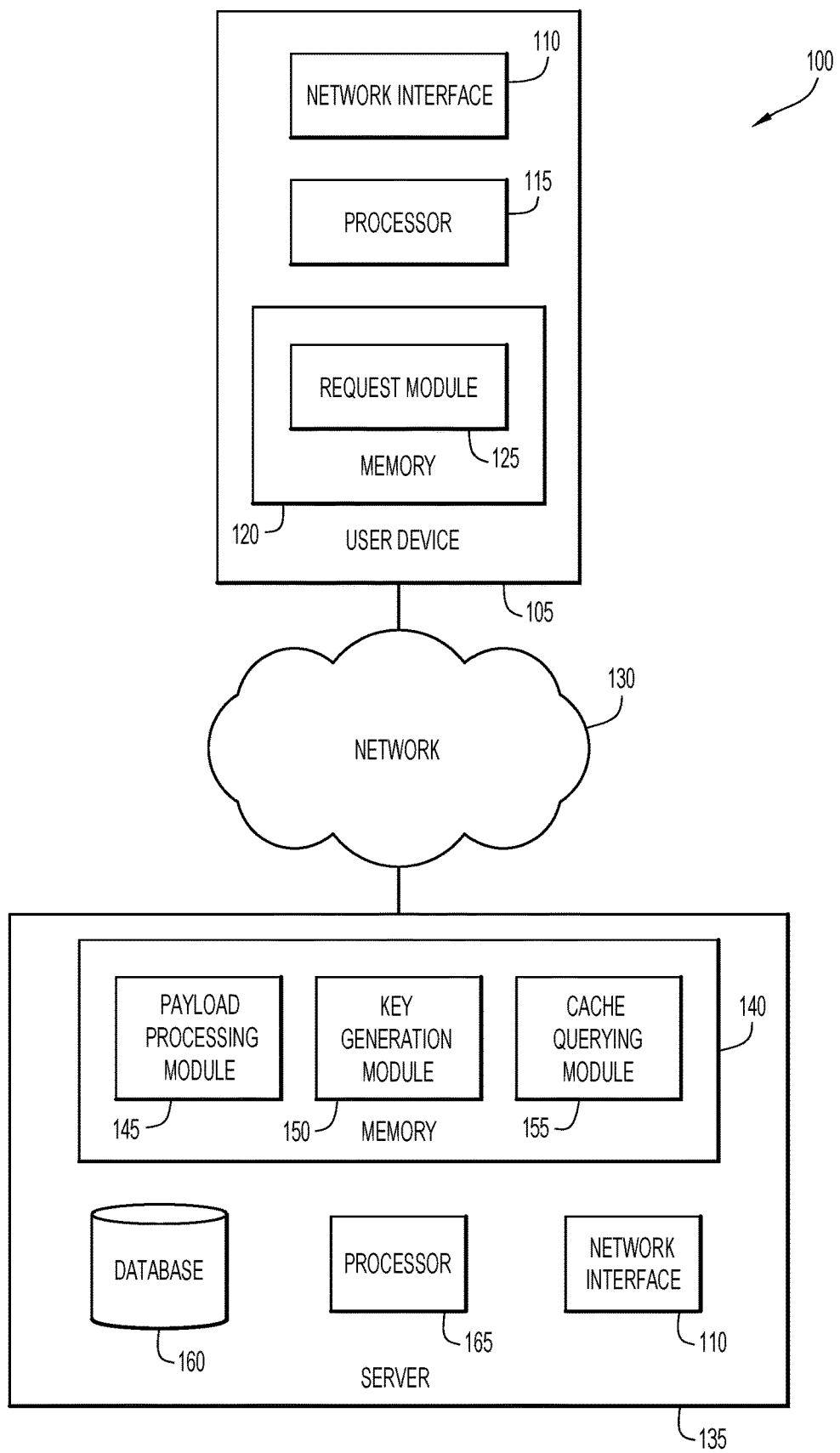
FIG. 1 is a block diagram depicting a computing environment for accessing cached data in accordance with an embodiment of the present invention.

Present invention embodiments relate generally to accessing cached data, and more specifically, to accessing cached data by generating hash keys in a manner that increases cache hit ratios. A cache hit occurs when the data that is requested can be found in a cache, and a cache miss occurs when the requested data is not in a cache. A cache hit ratio refers to the total number of cache hits over a given time period divided by the total number of requests made. In general, cache hit ratios are logarithmic; the closer to 100%, the exponentially greater the gains.

In order to quickly search a cache, a request may be converted to a hash key that can be used to search the cache using a hash map. If a hash value listed in the hash map matches the hash key, then a cache hit has occurred, and data associated with the hash value is provided to fulfill the request. Thus, each unique request may be converted to a unique hash key that can be used to search a cache. However, when two requests differ only in non-critical ways, applying a hashing algorithm to convert the two requests may result in two different hash keys, even though responses to either request would be substantively identical.

For example, a request may be processed by checking a cache, which is a form of fast memory, for a prior response to the request that has been processed and stored. When the cache contains the stored response to the request, the stored response is immediately returned in reply to the request. However, when the cache does not contain then response, then a larger slower memory may be checked, or the response may be processed again, thereby reducing processing speed and performance. A first request may differ from a second request only in the ordering of the parameters that comprise the payload body of the request. Thus, a response to either request should include the same data, but if a hash map only includes an entry for the first request's hash key, then a search of the hash map using the second request's hash key may result in the incorrect determination that the requested data cannot be found in the cache. Since the second request's hash key did not match any value in the hash map, the request may only be fulfilled by accessing the underlying data (in a slower memory) instead of the cache, or by re-calculating a result that was previously calculated for the first request. Present invention embodiments generate hash keys such that requests having only non-critical differences are mapped to the same hash key. By mapping requests that have non-critical differences to the same hash key, redundant calculations and data fetch operations may be avoided, resulting in a more efficient mechanism for accessing data that reduces a response time for serving requests and that uses fewer computing resources, such as processing resources and cache memory resources.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for accessing cached data in accordance with an embodiment of the present invention. As depicted, computing environment 100 includes a user device 105, a network 130, and a server 135. A user may submit a request via user device 105 for data from server 135. It is to be understood that the functional division among components of computing environment 100 have been chosen for purposes of explaining present invention embodiments, and is not to be construed as a limiting example.

User device 105 may include a network interface 110, at least one processor 115, and memory 120 with request module 125. In various embodiments of the present invention, user device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. User device 105 may include internal and external hardware components, as depicted and described in further detail with respect to FIG. 4.

Request module 125 may include one or more modules or units to perform various functions of present invention embodiments described below. The modules may be implemented by any combination of any quantity of software and/or hardware modules or units, and may reside within memory 120 of user device 105 for execution by a processor, such as processor 115.

Request module 125 may enable a user of user device 105 to make requests for data from a network-accessible storage, and to receive responses that include the requested data. Each request may comprise the name of the service that is being requested, as well as a payload body that contains the input for the requested service. In some embodiments, the payload body is a JavaScript Object Notation (JSON) object. The payload body may contain one or more attribute-value pairs, with each element comprising an attribute name paired with a value. After a remote server, such as server 135, processes the request, request module 125 may receive a response containing data corresponding to the request.

Network 130 may include a local area network (LAN), a wide area network (WAN) such as the Internet, or a combination of the two, and may include wired, wireless, or fiber optic connections. In general, network 130 can include any combination of connections and protocols that will support communications between user device 105 and server 135 via their respective network interfaces 110 in accordance with embodiments of the present invention.

Server 135 may include a network interface 110, memory 140, storage 160, and at least one processor 165. In general, server 135 receives requests that include a service name and a payload body for the service; the payload body is sorted according to a particular standard order (e.g., alphabetic), and the service name and sorted payload body are converted into a hash key. The hash key may be used to search an index of a database, such as a hash map, to access cached data. For example, if the hash key matches an entry in a hash map, then the value corresponding to the entry may indicate a location in the cache where the desired results are stored.

Payload processing module 145, key generation module 150, and cache querying module 155 may include one or more modules or units to perform various functions of present invention embodiments described below. The modules may be implemented by any combination of any quantity of software and/or hardware modules or units, and may reside within memory 140 of server 135 for execution by a processor, such as processor 165.

Payload processing module 145 may process a request by reordering all of the attribute-value pairs in a payload body of the request according to a particular system of collation, such as a numerical order, an alphabetic order, or an alphanumeric order. Payload processing module 145 sorts attribute-value pairs into a specific order irrespective of the order in which the attribute-value pairs were originally listed in the payload body. Thus, two requests whose payload bodies contain the same attribute-value pairs but in different orders will be reordered by payload processing module 145 such that both requests have payload bodies that not only contain the same attribute-value pairs, but list the attribute-value pairs in the same order as well.

Payload processing module 145 may sort attribute-value pairs by first sorting by attribute name and then by value, or alternatively, by value and then by attribute name. Attribute-value pairs may be sorted according to any conventional or other sorting order. In some embodiments, attribute-value pairs are sorted using the Unicode Collation Algorithm. Once the contents of a payload body are sorted, payload processing module 145 converts the service name and sorted payload body into a string. In some embodiments, when the service name and sorted payload body are converted into a string, some characters, such as brackets, commas, or whitespace characters, may be omitted from the resulting string. In some embodiments, payload processing module 145 processes a payload body to remove any non-critical elements; the criticality of an element may be defined according to a business need for a particular task or service. For example, two requests may each have a payload having the same attribute-value pairs in the same order, but are nevertheless different in some trivial manner, such as having different formatting styles, or any other difference in their properties. However, as long as requests differ only in ways that are non-critical (e.g., differences that do not cause a service processing their payload bodies to produce different results), then payload processing module 145 may remove these differences so that the requests can be mapped to the same hash key.

Key generation module 150 may convert the string that is produced by payload processing module 145 into a hash key. Key generation module 150 may employ a conventional or other hash function to convert a string into a hash key. For example, key generation module 150 may convert strings into hash keys using the Message Digest 5 (MD5) algorithm, the Secure Hash Algorithm 3 (SHA-3), and the like. By consistently applying the same sorting order, stringification, and hash functions to requests, hash keys generated from different requests will be identical as long as the requests differ only in their ordering of attribute-value pairs.

Cache querying module 155 may use a hash key generated by key generation module 150 to query a cache. Cache querying module 155 may use the hash key to perform a lookup operation against a hash map to determine whether the cache contains the requested data. If searching a hash map using the hash key results in cache hit, then cache querying module 155 may retrieve the corresponding data that matches the hash key. If a query using the hash key results in a cache miss, then cache querying module 155 may inform a user of user device 105, and since the requested information is not satisfied by the cache, the original request from user device 105 may be used to compute a response.

Storage 160 may include any non-volatile storage media known in the art. For example, storage 160 can be implemented with flash memory, a tape library, optical library, one or more independent hard disk drives, or multiple hard disk drives in a redundant array of independent disks (RAID). Similarly, data in storage 160 may conform to any suitable storage architecture known in the art, such as a file, a relational database, an object-oriented database, and/or one or more tables. Data stored in storage 160 may include any cached results that represent solutions to particular requests, such as a request provided by user device 105 that names a service to process data provided in the payload body of the request.

Figure 2:
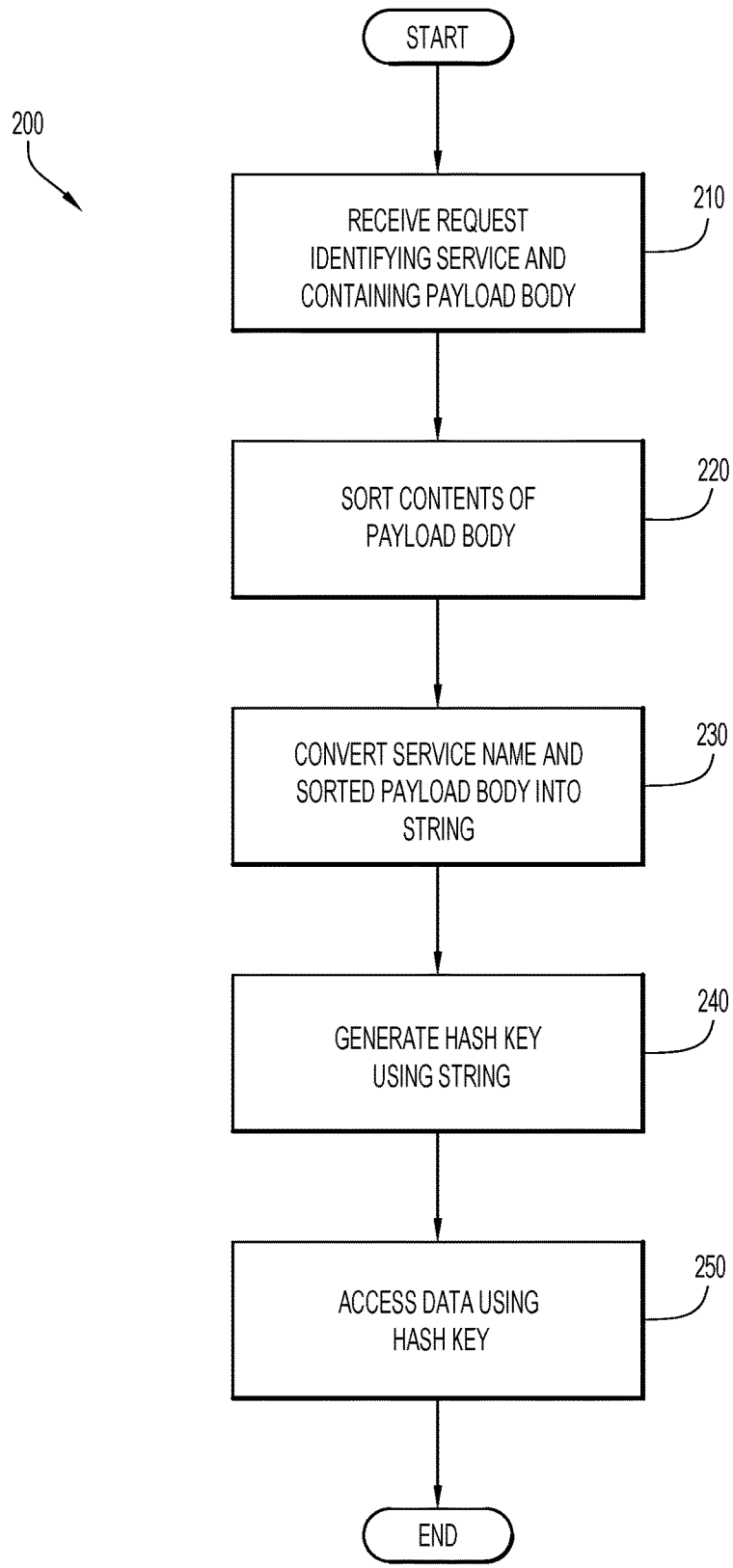
FIG. 2 is a flow chart depicting a method of accessing cached data in accordance with an embodiment of the present invention.

FIG. 2 is a flow chart depicting a method 200 of accessing cached data in accordance with an embodiment of the present invention.

A request is received that identifies a service and provides a payload body at operation 210. The request may be sent by user device 105 and received by server 135. The contents of the request may include the name of a service and a payload body; the payload body may include one or more attribute-value pairs that serve as input for the named service, which processes the attribute-value pairs to calculate a response to the request. However, repeated processing of a request can be avoided if a response that was previously calculated for the request is available in a cache.

The contents of the payload body are sorted at operation 220. The contents of a payload body may include any information and may be presented as a list of attribute-value pairs. Since the order of the attribute-value pairs may not affect the results that are returned by processing the request, the attribute-value pairs may be sorted so that requests containing the same attribute-value pairs but in different orders may be mapped to the same hash key. Any conventional or other sorting mechanism may be applied to payload bodies, as long as the payload bodies are consistently sorted according to the same sorting mechanism. The contents of a payload body may be sorted by payload processing module 145. Alphabetic sorting may be used to sort attribute names and/or values containing only alphabetic characters, but in the case of attribute names and/or values containing numbers or extended characters, sorting approaches that support alphanumeric, Unicode, or American Standard Code for Information Interchange (ASCII) characters may be employed.

The service name and sorted payload body are converted into a string at operation 230. Payload processing module 145 may combine the service name and sorted payload body together to create a string that contains the name of the service and all of the attribute-value pairs of a payload body in their properly-sorted order.

A hash key is generated using the string at operation 240. Key generation module 150 may process the string using a hash function to output a hash key. Since payload processing module 145 sorts each payload body before key generation module 150 processes the resulting string, requests that differ only in non-critical ways will be mapped to the same hash key at operation 240. Non-critical differences between requests may include requests that differ in the ordering of the attribute-value pairs in their payload bodies. The non-critical differences can be defined or configured based on a business model for a particular task. For example, input order of attribute-value pairs may not matter for some services. Furthermore, some services may contain trivial attribute differences that do not impact the service output at all.

Data is accessed using the hash key at operation 250. Cache querying module 155 may use the hash key to perform a lookup operation in a cache by consulting an index for the cache, such as a hash map. If there is a match in the index, then a cache hit has occurred, and cache querying module 155 may retrieve the data corresponding to the hash key from the cached memory. If, however, there is not an entry in the index that matches the hash key, then a cache miss has occurred, meaning that the cache does not contain the data that corresponds to a response to the request.

Figure 3:
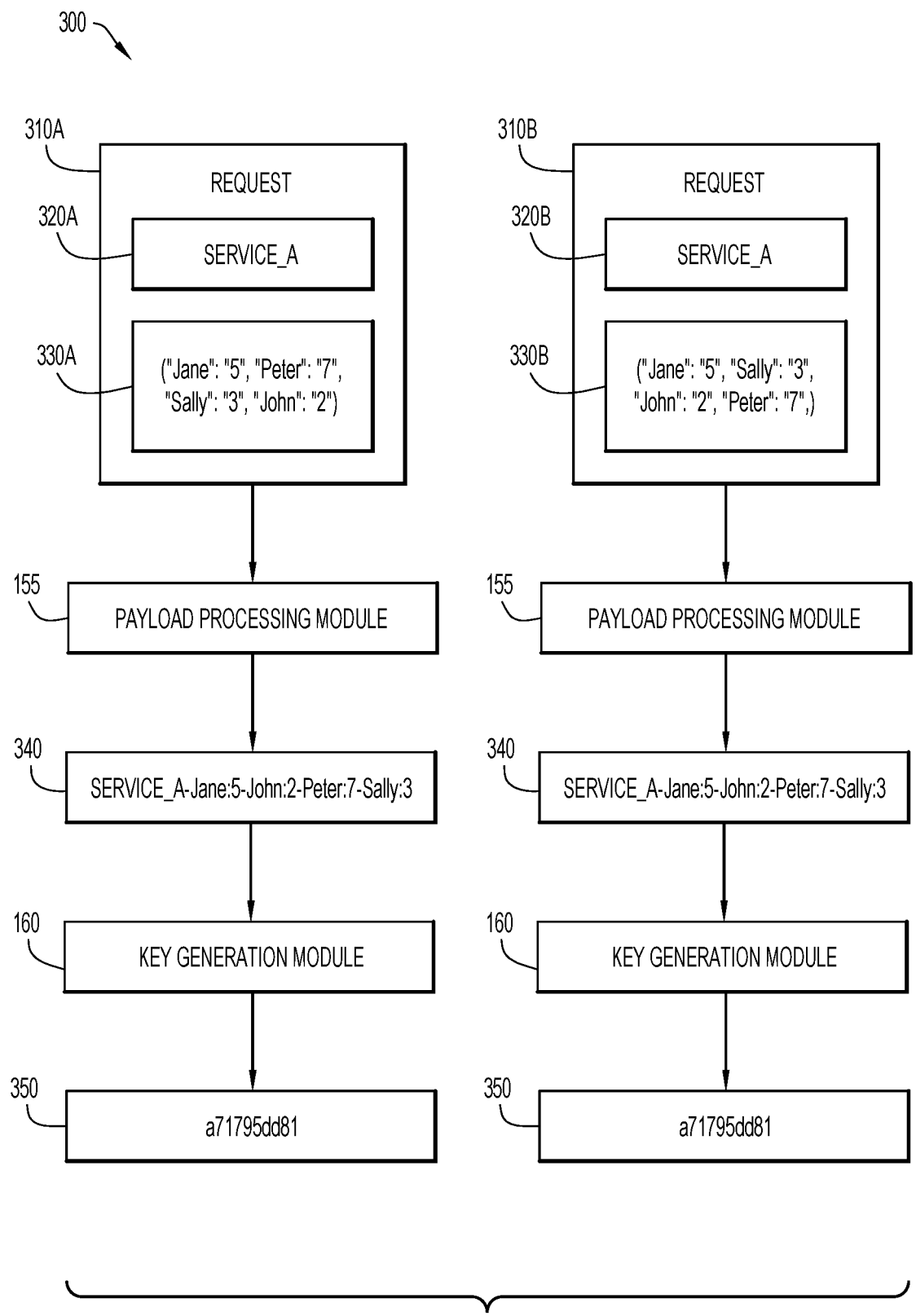
FIG. 3 is a data flow diagram depicting hash key generation in accordance with an embodiment of the present invention.

FIG. 3 is a data flow diagram 300 depicting hash key generation in accordance with an embodiment of the present invention. As depicted, two requests, 310A and 310B, are processed according to present invention embodiments. Requests 310A and 310B have payload bodies that share the same attribute-value pairs, but which are listed in different orders. It should be appreciated that requests 310A and 310B are depicted as having four attribute-value pairs in their payload bodies as an example, and there may be any number of attribute-value pairs in requests processed according to present invention embodiments.

Each request 310 may include a service name 320A, 320B and a payload body 330A, 330B. Requests 310A and 310B both name the same service, "SERVICE_A," and their payload bodies 330A, 330B include the attributes-value pairs, but in different orders: request 310A lists the attributes-value pairs in the order of Jane, Peter, Sally, and John, whereas request 310B lists the attribute-value pairs in the order of Jane, Sally, John, and Peter.

As the requests are processed by payload processing module 145, the attribute-value pairs may be sorted using the same approach to collation. In the depicted example, the attribute-value pairs are sorted alphabetically according to the attribute portion of the attribute-value pairs. Payload processing module 155 may then generate a string, such as string 340, that contains the service name and the sorted payload body. Finally, key generation module 160 may process the strings using one or more hashing algorithm to yield a hash key. Thus, by sorting the payload bodies of requests 310A and 310B prior to generating hash keys, request 310A and request 310B are both mapped to the same hash key 350 (e.g., a7195dd81) instead of to two different hash keys.

Figure 4:
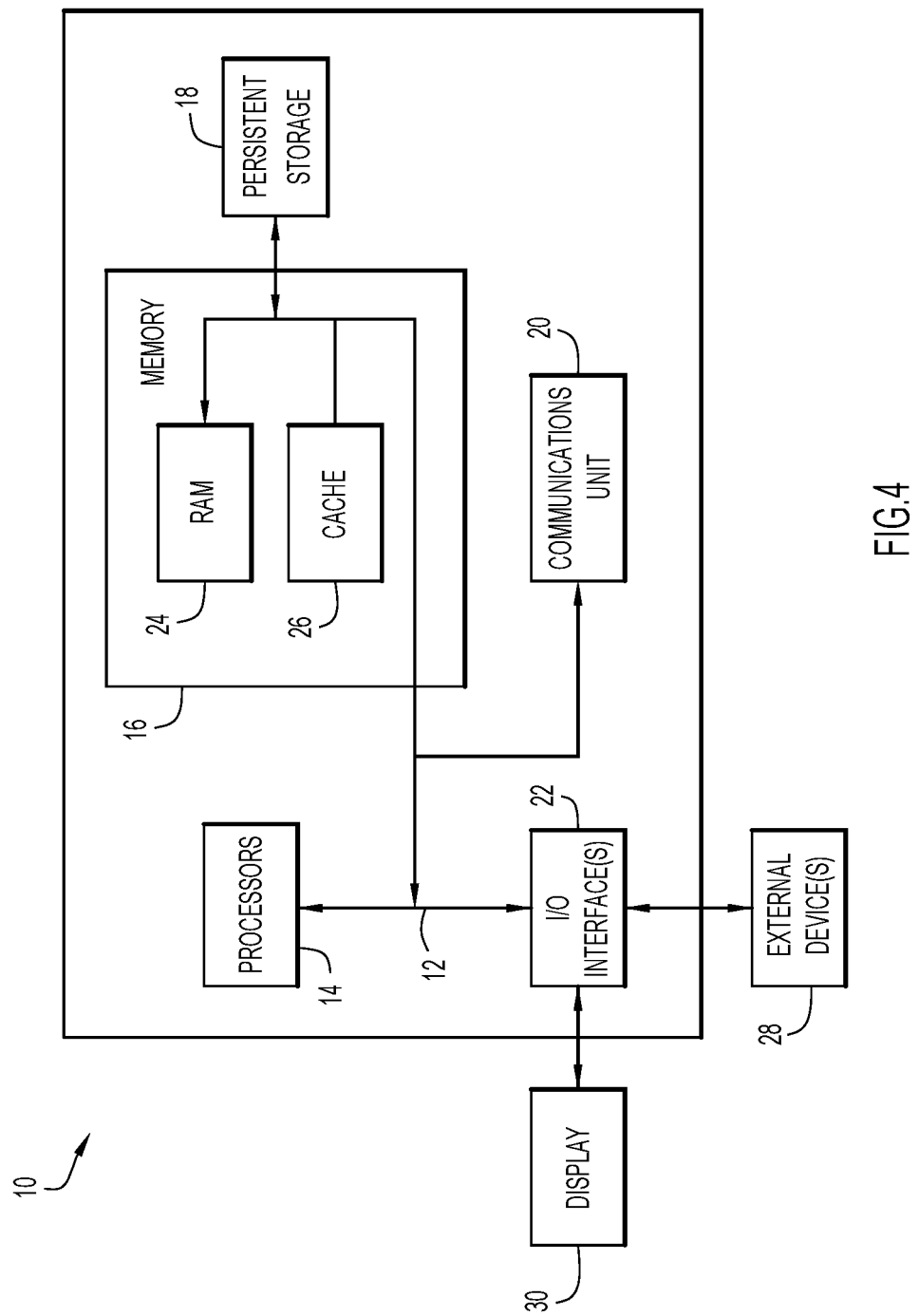
FIG. 4 is a block diagram depicting a computing device in accordance with an embodiment of the present invention.

FIG. 4 is a block diagram depicting components of a computer 10 suitable for executing the methods disclosed herein. Computer 10 may implement user device 105 and server 135 to access cached data using hash keys in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Processor(s) 14 and memory 16 may be substantially similar to processors 115 and 165 and memory 120 and 140 of FIG. 1, and persistent storage 18 may be substantially similar to storage 160 of FIG. 1. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data, such as data in a request (e.g., a service name, a payload body, etc.), data in a cache, and hash data (e.g., hash keys, hash tables, etc.), may be stored within any conventional or other data structures (e.g., files, arrays, lists, stacks, queues, records, etc.) and may be stored in any desired storage unit (e.g., database, data or other repositories, queue, etc.). The data transmitted between user device 105 and server 135 may include any desired format and arrangement, and may include any quantity of any types of fields of any size to store the data. The definition and data model for any of the data, such as data provided in a request or data stored in a cache, may indicate the overall structure in any desired fashion (e.g., computer-related languages, graphical representation, listing, etc.).

Data, such as data in a request (e.g., a service name, a payload body, etc.), data in a cache, and hash data (e.g., hash keys, hash tables, etc.), may include any information provided by user device 105 or provided to storage 160 of server 135. Data, such as data in a request (e.g., a service name, a payload body, etc.), data in a cache, and hash data (e.g., hash keys, hash tables, etc.), may include any desired format and arrangement, and may include any quantity of any types of fields of any size to store any desired data. The fields may indicate the presence, absence, actual values, or any other desired characteristics of the data of interest (e.g., quantity, value ranges, etc.).

The data, such as data in a request (e.g., a service name, a payload body, etc.), data in a cache, and hash data (e.g., hash keys, hash tables, etc.), may include any data provided to user device 105 and/or server 135, data processed by user device 105 and/or server 135, and/or any data generated by user device 105 and/or server 135.

The present invention embodiments may employ any number of any type of user interface (e.g., Graphical User Interface (GUI), command-line, prompt, etc.) for obtaining or providing information (e.g., requests to access cached data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of implementing embodiments for accessing cached data using hash keys.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, request module 125, payload processing module 145, key generation module 150, cache querying module 155, etc.). These systems may include any types of monitors and input devices (e.g., keyboard, mouse, voice recognition, etc.) to enter and/or view information.

It is to be understood that the software (e.g., communications software, server software, request module 125, payload processing module 145, key generation module 150, cache querying module 155, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., communications software, server software, request module 125, payload processing module 145, key generation module 150, cache querying module 155, etc.) may be available on a non-transitory computer usable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data in a request (e.g., a service name, a payload body, etc.), data in a cache, hash data (e.g., hash keys, hash tables, etc.), etc.). The database system may be implemented by any number of any conventional or other databases, data stores or storage structures (e.g., files, databases, data structures, data or other repositories, etc.) to store information (such as data in a request (e.g., a service name, a payload body, etc.), data in a cache, and hash data (e.g., hash keys, hash tables, etc.), etc.). The database system may be included within or coupled to the server and/or client systems. The database system may include a cache for storing results of processing requests using services. The database systems and/or storage structures may be remote from or local to the computer or other processing systems, and may store any desired data (such as data in a request (e.g., a service name, a payload body, etc.), data in a cache, and hash data (e.g., hash keys, hash tables, etc.), etc.).

The present invention embodiments may employ any number of any type of user interface (e.g., Graphical User Interface (GUI), command-line, prompt, etc.) for obtaining or providing information (e.g., data in a request (e.g., a service name, a payload body, etc.), data in a cache, hash data (e.g., hash keys, hash tables, etc.), etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method, in a data processing system comprising at least one processor and at least one memory, the at least one memory comprising instructions executed by the at least one processor to cause the at least one processor to access a storage device, the method comprising:

sorting contents of an object of a request, wherein the contents comprise a plurality of attribute-value pairs, wherein an attribute or value for at least one of the plurality of attribute-value pairs includes an extended character that remains as the extended character during the sorting, and wherein the sorting is performed using a Unicode Collation Algorithm;

generating a hash key to access information in the storage device based on the sorted contents of the object, wherein the object is mapped to the same hash key as a prior request with an object having the contents in a different arrangement, wherein generating the hash key further comprises generating a string comprising a name of the particular service requested and the sorted contents of the object, wherein the particular service processes the sorted contents of the object of the request to calculate a response to the request in response to determining that the response to the request was not previously calculated; and accessing the information in the storage device based on the generated hash key to produce a response to the request.

2. The computer-implemented method of claim 1, wherein the storage includes a cache and stores responses to prior requests.

3. The computer-implemented method of claim 2, wherein generating a hash key further comprises:

applying a hash function to the string to produce the hash key.

4. The computer-implemented method of claim 1, wherein the object includes a JSON object.

5. A computer system for accessing a storage device, the computer system comprising:

one or more computer processors;

one or more computer readable storage media;

program instructions stored on the one or more computer readable storage media for execution by at least one of the one or more computer processors, the program instructions comprising instructions to:

sort contents of an object of a request, wherein the contents comprise a plurality of attribute-value pairs, wherein an attribute or value for at least one of the plurality of attribute-value pairs includes an extended character that remains as the extended character during the sorting, and wherein the sorting is performed using a Unicode Collation Algorithm;

generate a hash key to access information in the storage device based on the sorted contents of the object, wherein the object is mapped to the same hash key as a prior request with an object having the contents in a different arrangement, wherein generating the hash key further comprises generating a string comprising a name of the particular service requested and the sorted contents of the object, wherein the particular service processes the sorted contents of the object of the request to calculate a response to the request in response to determining that the response to the request was not previously calculated; and access the information in the storage device based on the generated hash key to produce a response to the request.

6. The computer system of claim 5, wherein the storage includes a cache and stores responses to prior requests.

7. The computer system of claim 6, wherein the instructions for generating a hash key further comprise instructions to:

apply a hash function to the string to produce the hash key.

8. The computer system of claim 5, wherein the object includes a JSON object.

9. A computer program product for accessing a storage device, the computer program product comprising one or more computer readable storage media collectively having program instructions embodied therewith, the program instructions executable by a computer to cause the computer to:

sort contents of an object of a request, wherein the contents comprise a plurality of attribute-value pairs, wherein an attribute or value for at least one of the plurality of attribute-value pairs includes an extended character that remains as the extended character during the sorting, and wherein the sorting is performed using a Unicode Collation Algorithm;

generate a hash key to access information in the storage device based on the sorted contents of the object, wherein the object is mapped to the same hash key as a prior request with an object having the contents in a different arrangement, wherein generating the hash key further comprises generating a string comprising a name of the particular service requested and the sorted contents of the object, wherein the particular service processes the sorted contents of the object of the request to calculate a response to the request in response to determining that the response to the request was not previously calculated; and access the information in the storage device based on the generated hash key to produce a response to the request.

10. The computer program product of claim 9, wherein the storage includes a cache and stores responses to prior requests.

11. The computer program product of claim 10, wherein the instructions for generating a hash key further comprise instructions to:

apply a hash function to the string to produce the hash key.

12. The computer program product of claim 9, wherein the object includes a JSON object.

\* \* \* \* \*